United States Patent [19]
Bouressa

[11] Patent Number: 5,934,048
[45] Date of Patent: Aug. 10, 1999

[54] SEAL ASSEMBLY FOR EASY OPEN POUCH

[75] Inventor: Donald L. Bouressa, Simpsonville, S.C.

[73] Assignee: Cryovac, Inc., Duncan, S.C.

[21] Appl. No.: 08/841,173

[22] Filed: Apr. 29, 1997

[51] Int. Cl.[6] .................................................. B65B 9/06
[52] U.S. Cl. .................... 53/552; 53/389.3; 493/194; 493/203; 493/209; 493/237; 493/363; 493/930
[58] Field of Search ................................. 53/552, 389.3, 53/451; 493/186, 189, 193–199, 203, 206, 207, 209, 223, 227, 228–229, 232, 233, 237, 238, 239, 242, 341, 353, 354, 363, 364, 476, 378, 923, 930; 83/171, 695, 697; 30/303; 225/91

[56] References Cited

U.S. PATENT DOCUMENTS

| | | |
|---|---|---|
| 863,840 | 8/1907 | Freese . |
| 1,617,194 | 2/1927 | Born . |
| 3,181,438 | 5/1965 | Leary . |
| 3,874,976 | 4/1975 | MacFarland ............................ 156/515 |
| 4,147,583 | 4/1979 | Deutschlander ........................ 156/510 |
| 4,254,601 | 3/1981 | Prager ..................................... 53/133 |
| 4,546,596 | 10/1985 | Cherney .................................. 53/451 |
| 4,563,862 | 1/1986 | McElvy ................................... 53/552 |
| 4,582,555 | 4/1986 | Bower ..................................... 156/290 |
| 4,589,247 | 5/1986 | Tsuruta et al. .......................... 53/550 |
| 4,603,793 | 8/1986 | Stern ....................................... 222/105 |
| 4,656,818 | 4/1987 | Shimoyama et al. ................... 53/551 |
| 4,768,411 | 9/1988 | Su ............................................ 83/170 |
| 4,808,010 | 2/1989 | Vogan ..................................... 53/373 |
| 4,861,414 | 8/1989 | Vogan ..................................... 493/930 |
| 4,949,846 | 8/1990 | Lakey ..................................... 206/484 |
| 4,965,985 | 10/1990 | Masubuchi ............................. 53/479 |
| 5,325,995 | 7/1994 | Harrison et al. ........................ 222/81 |
| 5,371,997 | 12/1994 | Kopp ...................................... 53/412 |
| 5,463,851 | 11/1995 | Nagai ...................................... 53/552 |
| 5,533,322 | 7/1996 | Bacon ..................................... 53/451 |
| 5,584,166 | 12/1996 | Lakey ..................................... 53/451 |
| 5,678,392 | 10/1997 | Konno .................................... 53/451 |
| 5,702,339 | 12/1997 | Smiley .................................... 493/237 |

FOREIGN PATENT DOCUMENTS 1192164  8/1985  Canada .

*Primary Examiner*—Linda Johnson
*Attorney, Agent, or Firm*—Mark B. Quatt

[57] ABSTRACT

A pouch and a method and apparatus for forming an easy open pouch in a form-fill-seal process is disclosed. The apparatus includes a first bar; a means for cutting, housed within the first bar, the means for cutting including a main cutting blade having two ends, and a tear notch blade attached to the main cutting blade between the ends of the main cutting blade, the tear notch blade disposed at an angle to the longitudinal axis of the main cutting blade; a means for holding the means for cutting within the first bar; a second bar; and means for advancing the means for cutting from the first bar, and through the pouch material, and subsequently retracting the means for cutting from the pouch material, thereby severing the pouch material and cutting a tear notch in an upper transverse seal of a first pouch, and a lower transverse seal of a second pouch.

10 Claims, 3 Drawing Sheets

FIG. 6
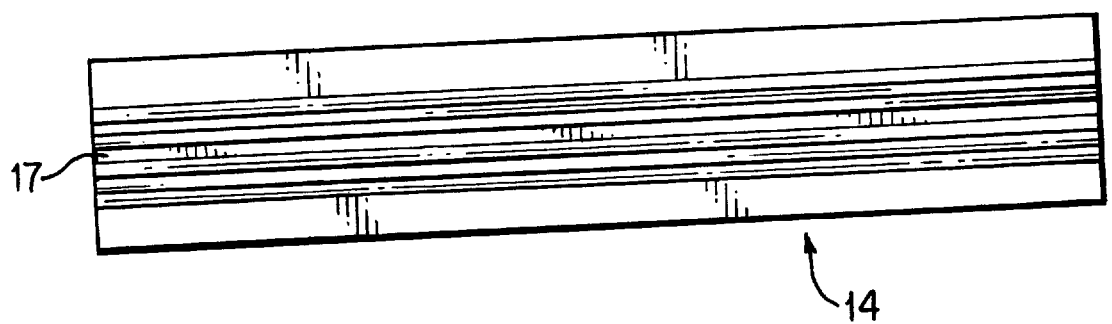
FIG. 7
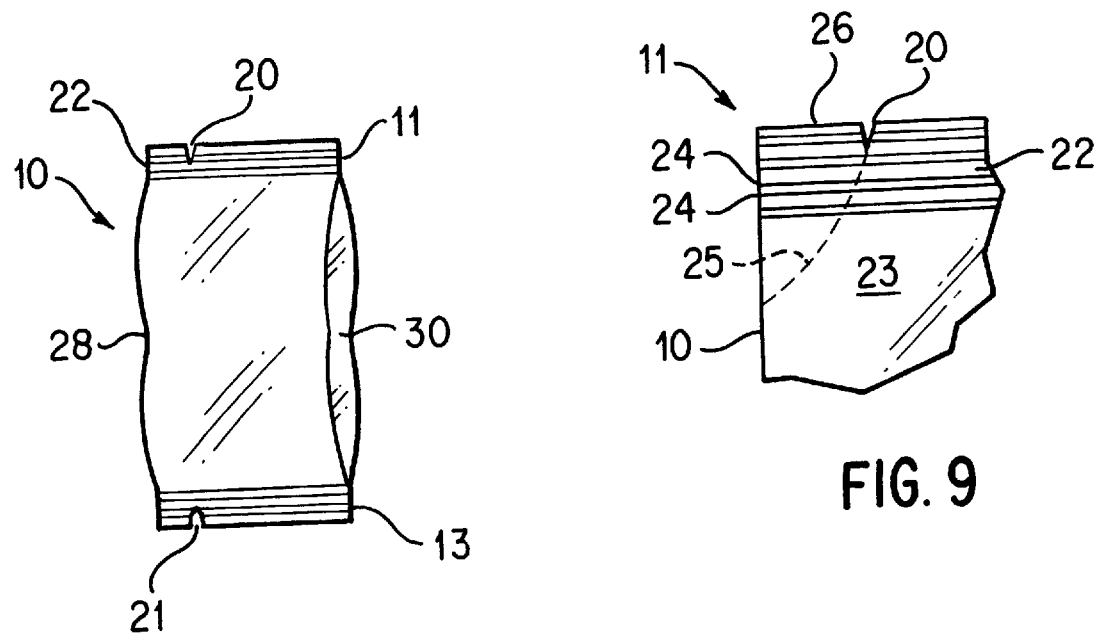
FIG. 8
FIG. 9

SEAL ASSEMBLY FOR EASY OPEN POUCH

FIELD OF THE INVENTION

This invention relates to a pouch and a method and apparatus for forming said pouch in a form-fill-seal process. Particularly, the invention relates to a method and apparatus for providing a pouch with an easy open seal so that the pouch may be readily opened without resort to a knife or scissors. This method and apparatus can be used to make vertical form/fill/seal (VFFS) packages for a wide variety of food and non-food items.

BACKGROUND OF THE INVENTION

In the field of packaging food and non-food pumpable and/or flowable products, a convenient method of packaging such products in thermoplastic film has been developed and is generally known as a form-fill-seal process. In such a process a tube is formed from thermoplastic film and the bottom end seal is made by transversely sealing across the tube with heated seal bars to form a conveniently wide heat seal and, consequently, producing a pouch ready to receive a product. After the heat seal is made, the pouch is filled and then another transverse heat seal is made across the width of the tube in a relatively wide band. This seal is transversely severed to separate the filled pouch from the next pouch to be filled. Thus, one wide band seal serves as the bottom seal for one pouch and the top seal for another.

Vertical form/fill/seal (VFFS) packaging systems have proven to be very useful in packaging a wide variety of flowable products. An example of such systems is the Onpack™ flowable food packaging system sold by W. R. Grace & Co.-Conn. through its Grace Packaging group. The VFFS process is known to those of skill in the art, and described for example in U.S. Pat. No. 4,589,247 (Tsuruta et al), U.S. Pat. No. 4,656,818 (Shimoyama et al.), U.S. Pat. No. 4,768,411 (Su), and U.S. Pat. No. 4,808,010 (Vogan), all incorporated herein by reference in their entirety. A flowable product is introduced through a central, vertical fill tube to a formed tubular film having been sealed transversely at its lower end, and longitudinally. The pouch is then completed by sealing the upper end of the tubular segment, and severing the pouch from the tubular film above it. The patents noted above describe a two stage process where the creation of a transverse heat seal occurs at one stage in the process, and then, downstream of the first stage, a separate pair of cooling/clamping means contact the just-formed transverse heat seal to cool and thus strengthen the seal.

More recently, a VFFS process has been developed wherein the upper transverse seal of a first pouch, and the lower transverse seal of a following pouch, are made, and the pouches cut and thereby separated between two portions of the transverse seals, without the need for a separate step to clamp, cool, and cut the seals. A commercial example of an apparatus embodying this more simplified process is the Onpack™ 2050A VFFS packaging machine marketed by the Grace Packaging Division of W. R. Grace & Co.-Conn.

Several ways of dispensing the contents of such pouches at their point of use, such as a restaurant, commissary, or the like, have been proposed. One is the use of an internal fitment sealed to the interior surface of a pouch wall, such as the Asept™ fitment distributed in the U.S. by W. R. Grace & Co.-Conn. through its Grace Packaging group, and disclosed in U.S. Pat. No. 4,603,793 (Stern). In use, a coupling device would be inserted through the pouch material to communicate with the internal fitment, and a conventional dispensing device would be connected to the coupling device for delivering measured portions of the contents of the pouch.

An alternative technique and apparatus for dispensing the contents of a pouch is the use of a pouring spout such as the Top-Tap™ pouring spout supplied by DuPont Canada, and described in differing embodiments in their Canadian Patent No. 1,192,164 (Obidniak) and U.S. Pat. No. 5,325,995 (Harrison et al). This system involves piercing the filled pouch with the sharp end (piercing nozzle) of a pouring spout, and driving the piercing nozzle into the pouch interior until the laminate forming the pouch wall engages the shoulder of the piercing nozzle. When this occurs, the plastic material forming the pouch will dispose around the shoulder of the nozzle, to be secured by a collar. The pouring spout can then be used to dispense the contents of the pouch.

In some cases, a packager may wish to forgo the use of internal or external fitments because of the additional packaging cost associated with such devices.

An alternative is simply to cut open the pouch with a knife at the time that the contents of the pouch are to be placed in a dispenser. However, this procedure, although simple, exposes the user to the possibility of injury when cutting open the pouch. Even if the cutting/opening operation is done without injury, this procedure leaves the choice of where to cut the pouch to the worker, which can cause spillage of the contained product. Additionally, for insurance reasons, many restaurants, such as some fast food outlets, do not permit knives or the like in the food preparation area of the restaurant.

It would thus often be desirable to avoid the necessity of using fitments, and the haphazard use of a knife or other sharp object to open the pouch, and to provide that the pouch could be simply and easily torn open at a preselected point on the pouch, chosen to make the opening process easier and reduce potential spillage.

However, many VFFS and other packaging applications require the use of packaging materials, especially flexible packaging materials, that can be used to package food or non-food articles and protect these articles during storage and distribution. Where flowable foods are packaged, as in many VFFS applications, the hydrostatic pressure of many oil and water based foods, and the high temperatures at which some foods are packaged, require a tough, impact and abuse resistant packaging material that will maintain its structural integrity during the packaging process, and subsequent distribution and storage. Film technology has progressed to the point where many films offer a high degree of abuse resistance. In addition, the heat seals of pouches made by this process are of flattened, relatively strong and tough thermoplastic film made even stronger and tougher by the fact that the seals form a two-ply heat welded band. Unfortunately, the same properties of toughness and abuse resistance that are desirable for the performance of the packaging material in protecting the contained article, often make it difficult or impossible for the end user to manually open the package without the aid of a knife or the like.

Various solutions to this problem have been proposed with a view to overcoming this problem and making it easier to open packages of the type just described, including the use of tear notches, perforations, slits, etc. which guide the user to a particular place on the pouch to initiate tear.

However, current systems for creating a tear notch in a VFFS system have relied on an additional knife that is affixed to a ribbed sealing bar, the bar used to create the transverse seals of each package. This knife projects from the face of the seal bar in a rigid, immovable arrangement, and is attached to the seal bar by set screws or the like. When the seal bar is activated by being heated and brought into contact with the pouch material, the knife simultaneously contacts and cuts the material that is being sealed, thereby severing the pouch material. Unfortunately, when used to make packages on a VFFS packaging machine, such a system sometimes leads to loosening of the set screws or other affixing devices as a result of the normal operation of the equipment. This in turn can result in the knife falling out of the sealing bar, thereby disrupting the packaging process. In a food processing facility, where VFFS systems are frequently employed, this disruption can cause economic loss to the processor, who must shut down the machine to recover the knife, and replace the knife in the sealing bar. This can also jeopardize the integrity of the packaged product, in the event that the knife falls inside a filled pouch. Finally, care must be used by the operator during routine cleaning of the seal bar, to avoid injury from the exposed knife.

It would therefore be of great benefit to the packaging industry to provide a method and apparatus that are compatible with current commercial packaging systems; operate independently of the seal bar; simultaneously cut the tube to provide a pouch, and cut an easy open tear notch in a transverse seal; and simultaneously provide an easy open tear notch in an upper transverse seal of a first package, and an easy open tear notch in a lower transverse seal of a second package above the first package.

SUMMARY OF THE INVENTION

In a first aspect, the present invention comprises an apparatus for making easy open seals in pouches made from a tubular pouch material, the apparatus comprising a first bar; a means for cutting, housed within the first bar, the means for cutting comprising a main cutting blade having two ends, and a tear notch blade attached to said main cutting blade between the ends of the main cutting blade, said tear notch blade disposed at an angle to the longitudinal axis of the main cutting blade; a means for holding the means for cutting within the first bar; a second bar; and a means for advancing said means for cutting from the first bar, through the pouch material, and subsequently retracting said means for cutting from the pouch material, thereby severing the pouch material and cutting a tear notch in an upper transverse seal of a first pouch, and a lower transverse seal of a second pouch.

In a second aspect, the present invention comprises a method for making easy open seals in pouches made from a tubular pouch material, the method comprising providing a first bar; holding a means for cutting within the first bar; providing a second bar; closing the tubular pouch material between the first and second bar; transversely heat sealing the pouch material; advancing the means for cutting from the first bar, and through the pouch material; and retracting said means for cutting from the pouch material, thereby severing the pouch material and cutting a tear notch in an upper transverse seal of a first pouch, and a lower transverse seal of a second pouch.

In a third aspect, the present invention comprises a filled pouch formed from a tube of thermoplastic film, the pouch comprising a central portion containing a product; a transverse heat seal disposed at each end of said pouch, each heat seal extending transversely across the width of the pouch; a tear notch in each transverse heat seal, said tear notch not extending to the central portion of the pouch, and extending to a respective end of the pouch; and whereby both notches are disposed substantially the same distance from a first side of the pouch.

BRIEF DESCRIPTION OF THE DRAWINGS

The present invention is illustrated by reference to the following drawings.

FIG. 6 represents a front, elevational view of a first sealing bar in accordance with the invention;

FIG. 7 represents a front, elevational view of a second sealing bar in accordance with the invention;

FIG. 8 is a perspective view of a pouch in accordance with the present invention;

FIG. 9 represents an enlarged partial perspective of the pouch of FIG. 8;

DESCRIPTION OF THE PREFERRED EMBODIMENTS

Figure 1:
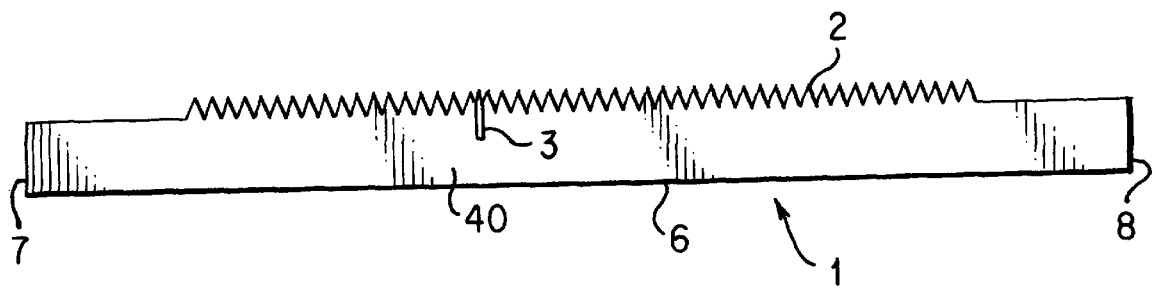
FIG. 1 represents a front, elevational view of a main cutting blade and a tear notch blade according to the present invention.

FIG. 1 illustrates in front elevational view a means for cutting 1 including a main cutting blade 6 having an edge of sharpened teeth 2, and attached thereto by suitable means, a tear notch blade 3.

Blade 6 can be made from any suitable material, but is preferably metallic; and can be of any suitable dimension and shape, but is preferably straight so that a straight cut in the pouch material results in a straight edge in the final pouch. The blade can have a smooth cutting edge, but is preferably jagged, such as a typical serrated knife edge of the type shown. Blade 6 can be made by any suitable process, but is preferably produced by Wire Electrical Discharge Machining (EDM). This is a technique used on conductive materials such as metals. A wire is brought down from a spool; current is passed through the wire; when the metal work piece comes into the vicinity of the charged wire, arcing from the wire to the workpiece occurs, and the conductive material melts. A special liquid comes down the wire, and voids or cuts in the blade are produced.

Figure 2:
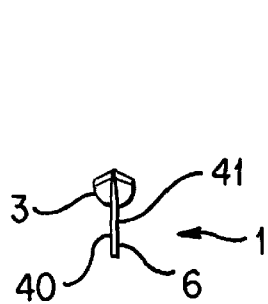
FIG. 2 represents a side view of the blades of FIG. 1.
Figure 3:
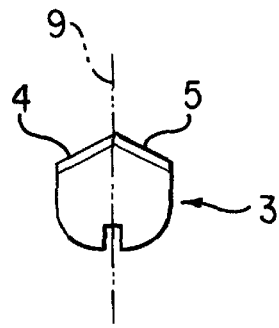
FIG. 3 represents an enlarged side view of the tear notch blade of FIG. 1.
Figure 4:
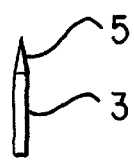
FIG. 4 represents an enlarged front, elevational view of the tear notch blade of FIG. 1.

FIGS. 2 through 5 show main cutting blade 6 and/or tear notch blade 3 in different aspects. Tear notch blade 3 is preferably a single element, and can be of any suitable dimension and shape. It is preferably disposed to seat symmetrically on blade 6, as shown in FIG. 2. The cutting edges 4 and 5 are contiguous, and can form together a straight line or curved line, but are preferably beveled (i.e. form an angle with respect to each other) as best shown in FIG. 3. This configuration results in reduced surface tension and a smoother cut in the pouch material when blade 3 is activated. The cutting edges 4 and 5 of tear notch blade 3 preferably have a smooth cutting edge, but can have any suitable cutting surface.

Tear notch blade 3 can be positioned at any point along the length of blade 6, but is preferably disposed closer to one end of blade 6 than the other end of blade 6. For example, in FIG. 1, tear notch blade 3 is shown as positioned on main cutting blade 6 at a location closer to the left end 7 of the main cutting blade 6 than to the right end 8 of main cutting blade 6.

Tear notch blade 3 can be positioned at any suitable angle with respect to the disposition of main cutting blade 6. As shown in the drawings (see especially FIGS. 1 and 2), tear notch blade 3, in its widest plane, is preferably perpendicular to the longitudinal axis of main cutting blade 6. Also, as shown in the drawings, tear notch blade 3, in its longitudinal axis 9, is preferably perpendicular to the longitudinal axis of main cutting blade 6. Tear notch blade 3 is preferably symmetrically positioned on first cutting blade 6 (see FIG. 5) so that the resulting tear notches of the two transverse seals of a pouch of the invention are of the same length. However, edges 4 and 5 can alternatively be of different length, resulting in tear notches of the two transverse seals of a pouch of the invention of different length.

Figure 5:
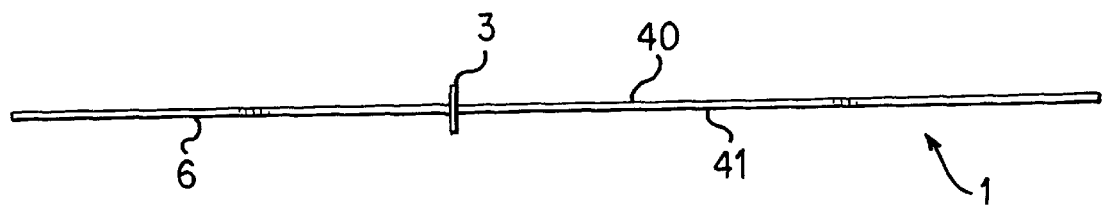
FIG. 5 is a view of a cutting blade according to the present invention, including an easy open tear notch blade, looking at the blade along a plane along which the blade will reciprocally move when in operation.

Main cutting blade 6 has two major sides 40 and 41 (see FIGS. 1 and 5).

FIG. 6 shows a first seal bar 12. This bar is otherwise conventional, but includes a housing 15 conforming generally to the cross-sectional shape (see FIG. 5) of the main cutting blade 6 and the tear notch blade 3. Seal bar 12 preferably has a smooth sealing surface. The main cutting blade 6 and tear notch blade 3 are housed inside the first seal bar 12 in housing 15, held in place by suitable means for holding such as a pair of clamps or the like (see FIG. 11).

FIG. 7 shows a second seal bar 14. This seal bar is otherwise conventional, but includes an opening or guide passage 17 conforming generally to the cross-sectional shape (see FIG. 5) of the main cutting blade 6 and the tear notch blade 3, whereby said blades can readily be accommodated as they advance from the seal bar 12, advance to cut the pouch material in the transverse seal area of the pouch, and then retract. Seal bar 14 preferably has a ribbed sealing surface.

In operation, main cutting blade 6 and tear notch blade 3 are preferably driven reciprocally by a pneumatic cylinder or other suitable means for advancing, such as an electromechanical or cammed mechanical means, upon signal or by other synchronization means, which will be evident to those in the art. The means for advancing is not shown. One advantage of the invention is that the blade combination is not affixed in a rigid manner to seal bar 14. Thus, prior art problems associated with cutting blades becoming loose and detaching from the sealing means are avoided. Also, since the blades 6 and 3 are, in their inactive state, recessed within bar 12, they are not exposed beyond the face of bar 12, and therefore do not represent a potential hazard for the equipment operator.

Bars 12 and 14 are preferably each of one piece construction.

FIGS. 8 and 9 show a preferred pouch 10 of the present invention wherein the pouch is filled with product or contents 23 and has tear notches 20 and 21 in upper transverse seal 11 and lower transverse seal 13 respectively. Seals 11 and 13 are relatively wide heat seals and are ribbed. As shown in FIG. 9, when seal portion 26, which is the portion of the transverse heat seal 11 extending outwardly from the tear notch 20 toward a side 28 of the pouch, is manually gripped and pulled downwardly and to the left the seal will tear along a line approximated by the dotted line 25 to open a corner of the pouch. This provides a very convenient and easy way to dispense the contents of the pouch. Preferably, at least two seal ribs 24 are provided below the bottom of the tear notch 20, between the bottom of the notch 20 and the portion of the pouch which contains the contents 23, thereby providing a secure hermetic seal and preventing inadvertent opening or tearing of the pouch, and preventing premature exposure of the contents 23 to the outside environment.

Figure 10:
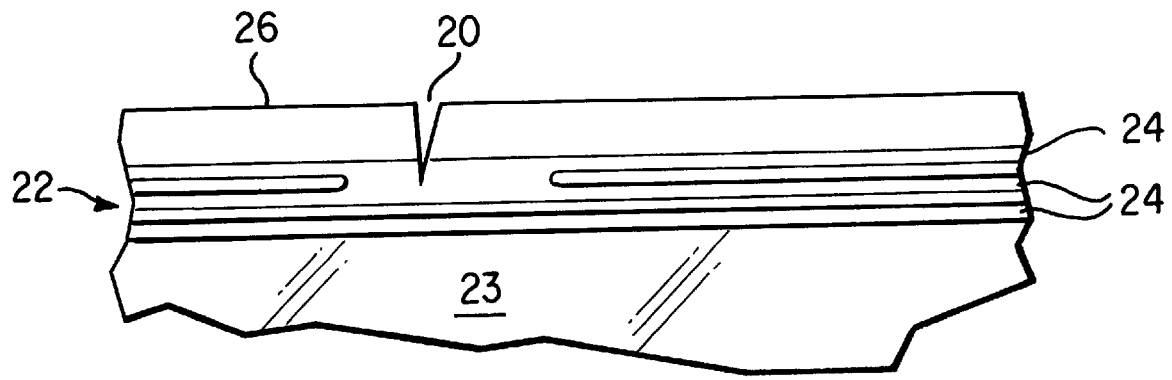
FIG. 10 represents an enlarged partial perspective of a pouch in accordance with the invention.

FIG. 10 shows an enlarged view of an upper transverse seal 11, and shows that the tear notch 20 is disposed in a sealed portion of the transverse seal. Seal ribs 24 assure that the contents 23 of the filled pouch are not exposed to the environment as a result of the creation of the tear notch. The area of the transverse seal immediately surrounding the tear notch 20 is hermetically sealed.

Figure 11:
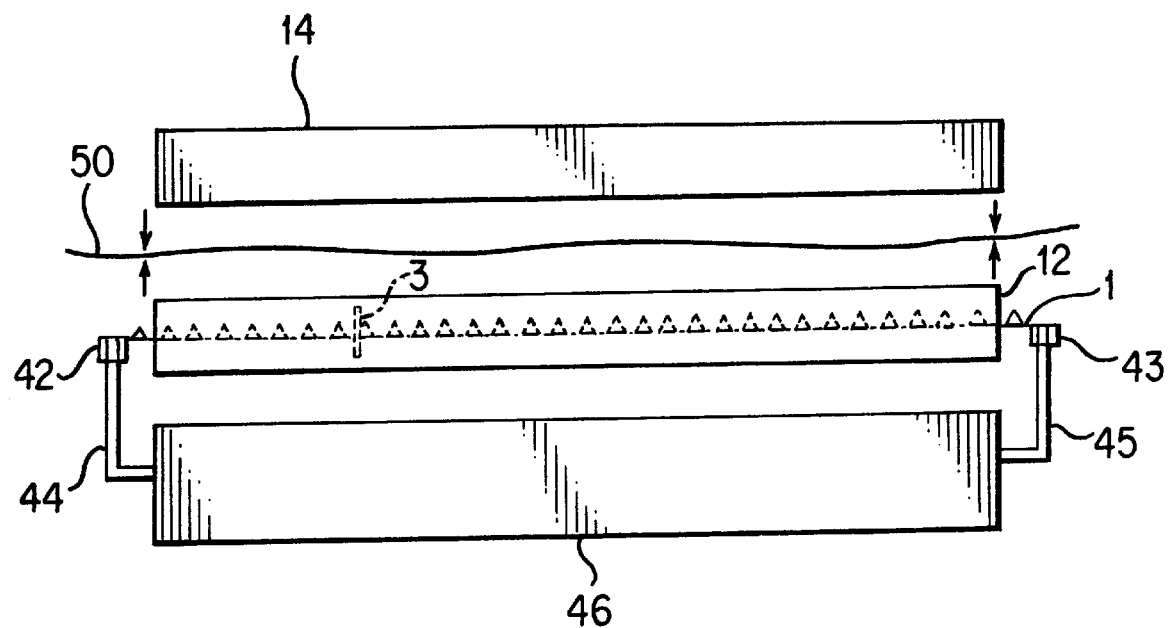
FIG. 11 represents a schematic top view of a pair of bars, and the means for cutting, in accordance with the invention.

FIG. 11 shows a schematic top view of a pair of seal bars 12 and 14. These are viewed as one would view this system from the top of a typical VFFS machine, looking downwardly toward the seal bars. Means for cutting 1 is disposed or housed within, but not attached to, first seal bar 12. The portion of the means for cutting 1 that is disposed within seal bar 12 is shown in phantom. The ends of means for cutting 1 extend beyond the ends of seal bar 12. The means for cutting is held by means for holding 42,43 such as clamps or the like, which are connected by means for connecting 44,45 such as steel rods or members, to a casting 46. Connecting means 44,45 are connected to a means for advancing (not shown), such as a conventional pneumatic system, to permit selective reciprocal movement of the means for connecting 44,45, and thus means for holding 42,43 and means for cutting 1, in the operation of the invention.

In operation, a tube 50 of thermoplastic material can be either a seamless tube or, preferably, a tube formed from a sheet of flattened film by a longitudinal seal. The film material is preferably a relatively strong, heat sealable film having good seal strength and, if extended shelf life of the contents is desired, the film may have gas barrier properties. The tube is clamped by squeeze rollers and filled with a charge of pumpable or flowable product 23. Below the squeeze rollers, seal bars 12 and 14 are moved toward each other, as shown by the arrows in FIG. 11, to contact and flatten a portion of the pouch material 50. The thus flattened portion of the pouch material is sealed by the pair of seal bars 12 and 14 which are heated to the heat welding temperature of the particular thermoplastic film from which the film is formed. These bars make a relatively wide band seal transversely across the tube. This seal forms the top or upper transverse seal for a lower or filled pouch, and will also form the lower or bottom transverse seal for the next to be formed pouch. The means for cutting is "fired", i.e. differentially advanced from within the first seal bar, by appropriate means for advancing, from the housing 15 of seal bar 12, and through the pouch material, thus severing the pouch material and cutting tear notches in the material. After the cutting of the pouch material, including forming of the tear notches, is completed, the means for cutting is then retracted back into housing 15. A spring disposed in casting 46 can enable or assist the retraction of means for cutting 1.

The method and apparatus of the present invention present a way in which a pouch can be provided with an easy open feature at both its top and bottom ends at the same time, but without the concerns of conventional systems. This makes it particularly advantageous to the consumer who does not have to search for which end of the pouch to open, and the tab is provided to quickly tear off a corner of the pouch. The notches which guide the tear are preferably not on the centerline of the pouch but are to one side or the other of it so that a tear-off corner is provided.

It is to be understood that variations and modifications of the present invention may be made without departing from the scope of the invention. For example, although the invention has been described herein with respect to first and second seal bars, the means for cutting can alternatively be housed within a pair of cooling/cutting clamps or bars which operate independently of, or are distinct from, separate seal bars. These cooling/cutting clamps or bars can be of the type disclosed in U.S. Pat. No. 4,589,247 (Tsuruta et al), U.S. Pat. No. 4,656,818 (Shimoyama et al.), U.S. Pat. No. 4,768,411 (Su), and U.S. Pat. No. 4,808,010 (Vogan).

Thus, the present invention can be used both in the "two-step" VFFS process described in the background of this disclosure, as well as in the "one-step" process exemplified by the onpack™ 2050A VFFS packaging machine.

What is claimed is:

1. An apparatus for making easy open seals in pouches made from a tubular pouch material, the apparatus comprising:
   (a) a first seal bar, said first seal bar including a housing disposed in said seal bar for accommodating a means for cutting, the first seal bar operable in conjunction with a second seal bar for creating a heat seal in a flattened portion of the tubular pouch material;
   (b) a means for cutting, retractable housed within the first seal bar, the means for cutting comprising a main cutting blade having two ends, a first major surface and a second major surface, and a longitudinal axis, and a tear notch blade attached to said main cutting blade between the ends of the main cutting blade, said tear notch blade
      i) disposed at an angle to the longitudinal axis of the main cutting blade, and
      ii) having a cutting edge, a first portion of which projects from the first major surface of the main cutting blade, and a second portion of which extends from the first portion and projects from the second major surface of the main cutting blade;
   (c) a means for holding the means for cutting in a recessed position within the first seal bar;
   (d) a second seal bar, said second seal bar including a guide passage conforming generally to the means for cutting; and
   (e) a means for advancing said means for cutting from the recessed position within the first seal bar, through the pouch material, and subsequently retracting said means for cutting from the pouch material, thereby severing the pouch material, and cutting a tear notch in an upper transverse seal of a first pouch, and a lower transverse seal of a second pouch.

2. The apparatus of claim 1 wherein the first seal bar has an opening therein for accommodating the means for cutting.

3. The apparatus of claim 1 wherein the first and second portions of the cutting edge of the tear notch blade are contiguous.

4. The apparatus of claim 1 wherein the first and second portions of the cutting edge of the tear notch blade are disposed within a common plane, at an angle to each other, such that the first and second portions form a "V" shape.

5. The apparatus of claim 1 wherein the tear notch blade is disposed perpendicular to the longitudinal axis of the main cutting blade.

6. The apparatus of claim 1 wherein the tear notch blade is symmetrically positioned on the main cutting blade such that the first and second portions of the cutting edge of the tear notch blade each extend an equal distance from respective major surfaces of the main cutting blade.

7. The apparatus of claim 1 wherein the means for advancing said means for cutting comprises a pneumatic cylinder, an electromechanical means, or a cammed mechanical means.

8. The apparatus of claim 1 wherein the second seal bar is provided with a surface having a plurality of ribs for impressing a plurality of transverse seal lines in the pouch material.

9. The apparatus of claim 1 comprising a vertical form/fill/seal apparatus.

10. The apparatus of claim 1 wherein the pouch material advances vertically, and further comprising a means for horizontally advancing said means for cutting from the recessed position within the first seal bar, through the pouch material, and subsequently horizontally retracting said means for cutting from the pouch material, thereby severing the pouch material, and cutting a tear notch in an upper transverse seal of a first pouch, and a lower transverse seal of a second pouch.

* * * * *

UNITED STATES PATENT AND TRADEMARK OFFICE
CERTIFICATE OF CORRECTION

PATENT NO. : 5,934,048
DATED : August 10, 1999
INVENTOR(S) : Donald L. Bouressa

It is certified that error appears in the above-identified patent and that said Letters Patent are hereby corrected as shown below:

Column 7, line 26, delete "retractable", substituting therefor - - retractably - -.

Signed and Sealed this

Fifteenth Day of February, 2000

Attest:

Q. TODD DICKINSON

*Attesting Officer*                *Commissioner of Patents and Trademarks*